(12) United States Patent
Mitchell et al.

(10) Patent No.: US 6,488,293 B1
(45) Date of Patent: Dec. 3, 2002

(54) DRUM DOLLY

(75) Inventors: Donald J. Mitchell, Wellsburg, WV (US); Joseph C. Eddy, Wheeling, WV (US)

(73) Assignee: Eagle Manufacturing Company, Wellsburg, WV (US)

( * ) Notice: Subject to any disclaimer, the term of this patent is extended or adjusted under 35 U.S.C. 154(b) by 0 days.

(21) Appl. No.: 09/990,997

(22) Filed: Nov. 16, 2001

(51) Int. Cl.⁷ ............................. B62B 3/00; B62B 1/00
(52) U.S. Cl. ............... 280/47.34; 280/79.5; 280/47.371
(58) Field of Search ............................. 280/79.5, 47.34, 280/47.36, 47.371; 16/900, 408

(56) References Cited

U.S. PATENT DOCUMENTS

| | | | | |
|---|---|---|---|---|
| 1,321,713 A | * | 11/1919 | Buie | 280/47.371 |
| 2,321,981 A | * | 6/1943 | Bowers | 280/79.5 |
| 4,335,487 A | | 6/1982 | DiPierro et al. | 16/126 |
| 4,861,050 A | * | 8/1989 | Bergeron | 280/47.35 |
| 5,074,572 A | * | 12/1991 | Delmerico et al. | 280/47.34 |
| 5,088,751 A | | 2/1992 | Zint | 280/47.34 |
| 5,110,147 A | * | 5/1992 | Gershman | 280/79.5 |
| 5,163,577 A | | 11/1992 | Lee | 220/318 |
| 5,472,220 A | | 12/1995 | Stephan | 280/79.5 |
| 5,538,267 A | * | 7/1996 | Pasin et al. | 280/87.01 |
| 5,632,497 A | * | 5/1997 | Murray | 280/47.35 |
| 5,647,415 A | | 7/1997 | Onders et al. | 141/331 |
| 5,752,543 A | | 5/1998 | Groening | 137/312 |
| 5,758,888 A | * | 6/1998 | Burgan et al. | 280/47.34 |
| 5,816,586 A | | 10/1998 | Richmond | 280/47.34 |
| 6,027,128 A | * | 2/2000 | Stich et al. | 280/47.16 |
| D423,173 S | | 4/2000 | Horner et al. | D34/24 |
| 6,152,317 A | | 11/2000 | Newby, Sr. | 220/4.22 |
| D440,371 S | | 4/2001 | Stanek et al. | D34/24 |

* cited by examiner

*Primary Examiner*—Brian L. Johnson
*Assistant Examiner*—G B Klebe
(74) *Attorney, Agent, or Firm*—Armstrong, Westerman & Hattori, LLP

(57) ABSTRACT

A non-corrosive dolly for storing containment drums having contained therein material which is potentially hazardous to the environment if spilled or leaked. Components of the dolly form a containment cavity for capturing and containing any spilled or leaked material. A handle, for conveniently moving the dolly and stored drum, is slidably engageable with a base of the dolly when oriented vertically downward, locked to the dolly when in position for use, and restrained for self-storing when oriented vertically upward.

10 Claims, 8 Drawing Sheets

DRUM DOLLY

FIELD OF THE INVENTION

The present invention is a non-corrosive dolly upon which to store a containment drum to facilitate movement of the drum. The dolly provides for capture and containment of material leaked or spilled from the drum as well as a self-storing handle for ease of moving the drum.

BACKGROUND OF THE INVENTION

Industrial and commercial liquids are conveniently stored in metal or plastic containment drums. For example, 30 and 55 gallon drums and 95 gallon over-pack drums are widely used for storing materials in virtually every industry. In commercial establishments, the same drums are used for storing cleaning materials or the like. Often, it is convenient to permanently store each drum on a dolly so as to facilitate movement of the drum throughout a commercial or industrial facility and avoid the often difficult task of repeatedly loading a drum on a dolly, which often requires at least two workers.

It is desirable to have the dolly for achieving the above storage method to have a portion of the dolly adapted for capturing and containing material which might be leaked or spilled from the drum. Also, for convenience, since filled drums can weigh up to about 1000 pounds, it is desirable to have a grasping means for moving the dolly and drum, such as a handle which extends outwardly from the dolly. Having a handle which can easily be engaged with the dolly, and can be easily positioned and held securely in an upright position adjacent to the drum when not being utilized, is also a desirable feature.

OBJECTS OF THE INVENTION

It is an object of the present invention to provide a device, for storing a containment drum, which enables movement in an easy and safe manner.

It is another object of the present invention to provide a device which provides containment means to protect the environment from contamination with spilled or leaked hazardous materials.

It is still another object of the present invention to provide a grasping means to facilitate movement of a drum and provide for storage of that grasping means in a convenient, space saving, secure, and safe manner.

BRIEF SUMMARY OF THE INVENTION

The present invention is a non-corrosive dolly for use with a drum in which material is stored. The dolly includes three separate components, a base, a set of casters, and an elongated handle. The base supports the bottom end of the drum and has a drum support portion, upon which the bottom end of the drum bears; a bottom portion disposed directly beneath the drum support portion, and inner and outer wall portions extending from the drum support portion and the bottom portion respectively. A containment cavity is provided which is formed at least in part by the drum support portion and the inner wall portion for capturing and containing stored liquid which might be spilled or leaked from the drum. A handle connector extends from the outer wall portion of the base. The casters are disposed beneath the bottom portion of the base and provide contact with a dolly supporting surface. A detachable elongated handle has a connecting end, for pivotally engaging the handle connector, and an opposite grasping end for use in moving the dolly about on the dolly supporting surface. When the base is oriented with the casters contacting a horizontal dolly supporting surface, the elongated handle is: pivotable about a horizontal axis when connected to the handle connector; slidably connectable to or disconnectable from the handle connector only when it is oriented vertically downward; locked to the handle connector when it is connected to the handle connector and pivoted to be oriented other than vertically downward; and restrained from pivoting when it is connected to the handle connector and oriented vertically upward.

DETAILED DESCRIPTION OF THE INVENTION

Figure 1:
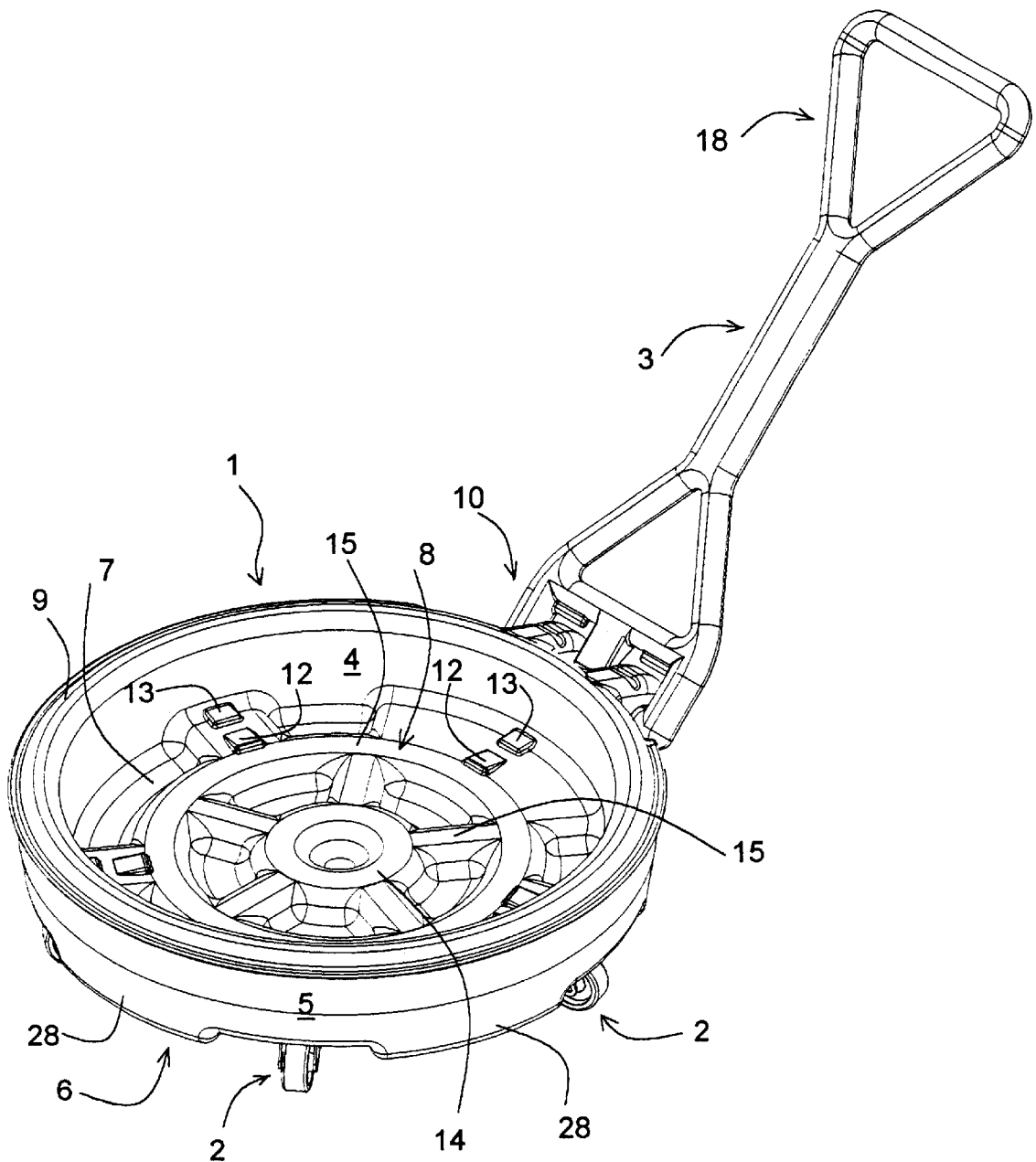
FIG. 1 is a perspective drawing of the dolly of the invention with a handle oriented in a position to facilitate movement of the dolly.

The dolly of the present invention includes a dolly base, a set of casters, and an elongated handle connected to the dolly base to facilitate movement of the dolly. FIG. 1 is a perspective drawing of the dolly, without a drum in place, so as to show all of the components of the dolly base. In FIG. 1, a dolly base, which is preferably circular in shape, is indicated at 1, casters at 2, and an elongated handle at 3. The dolly base includes an inner wall portion 4, an outer wall portion 5, a bottom portion 6 (hidden from view), a drum support portion 7 which is of annular shape and inward of inner wall portion 4, a top central portion 8 located inward of the drum support portion 7, a top rim portion 9 connecting upper ends of the inner and outer wall portions 4 and 5, and a handle connector 10 extending from outer wall portion 5.

The entire dolly base 1 is preferably blow molded as a single piece from a plastic material, such as polyethylene. The blow molding is carried out to preferably produce wall thicknesses between about $3/16$ inch and $5/16$ inch.

Figure 2:
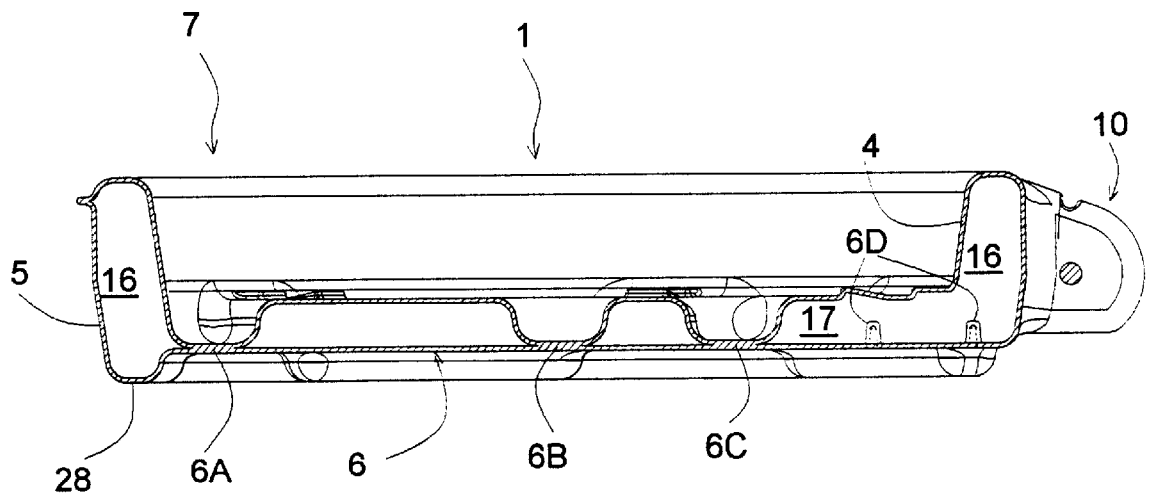
FIG. 2 is a cross-sectional side view of the dolly of the invention taken along a vertical plane indicated as 2—2 in the drawing of FIG. 5.
Figure 5:
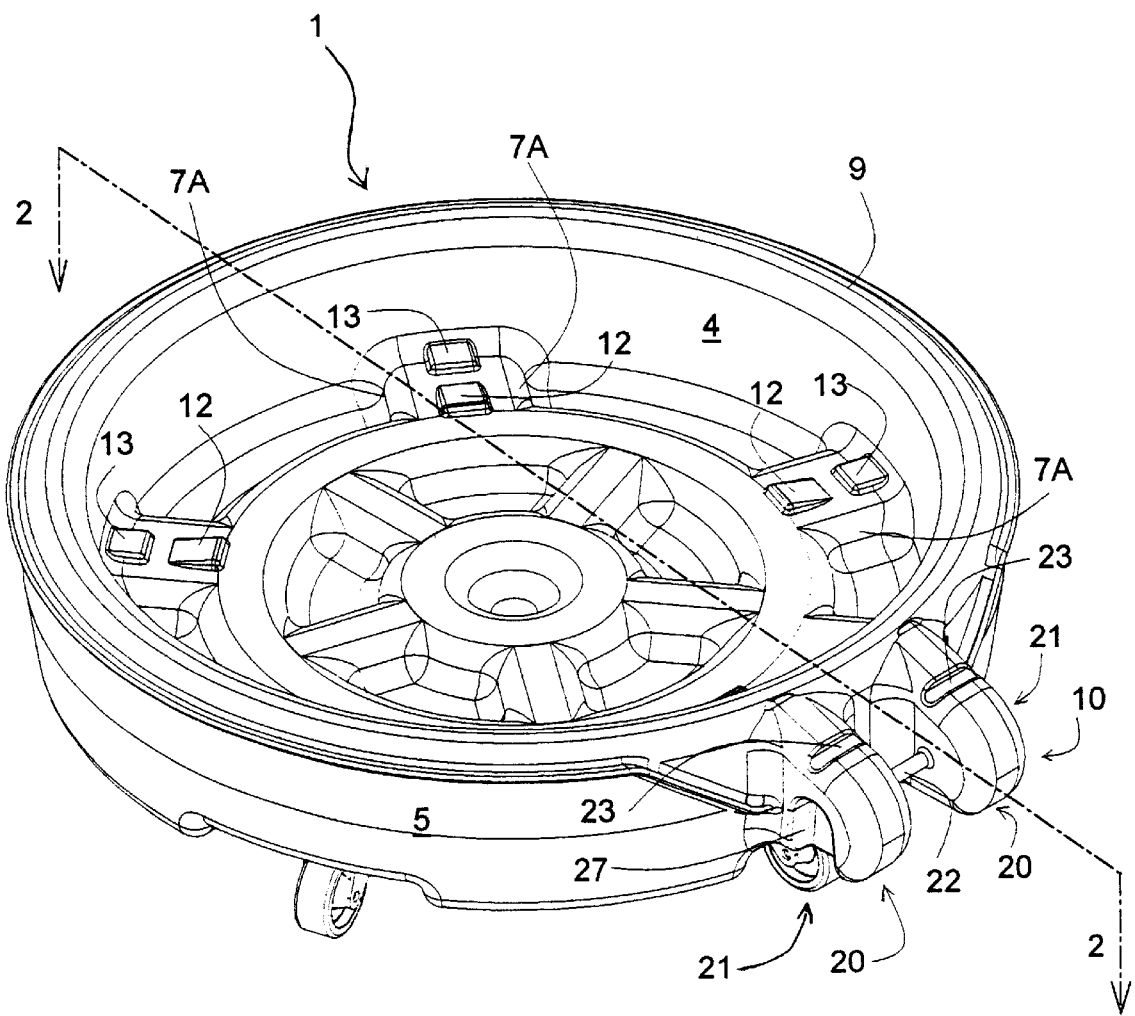
FIG. 5 is a perspective drawing of the dolly of the invention with the handle removed so as to show details of a handle connector.

FIG. 2 is a cross-section, in a vertical plane indicated at 2—2 of FIG. 5, for viewing preferred arrangements of the various walls of the dolly base.

Figure 3:
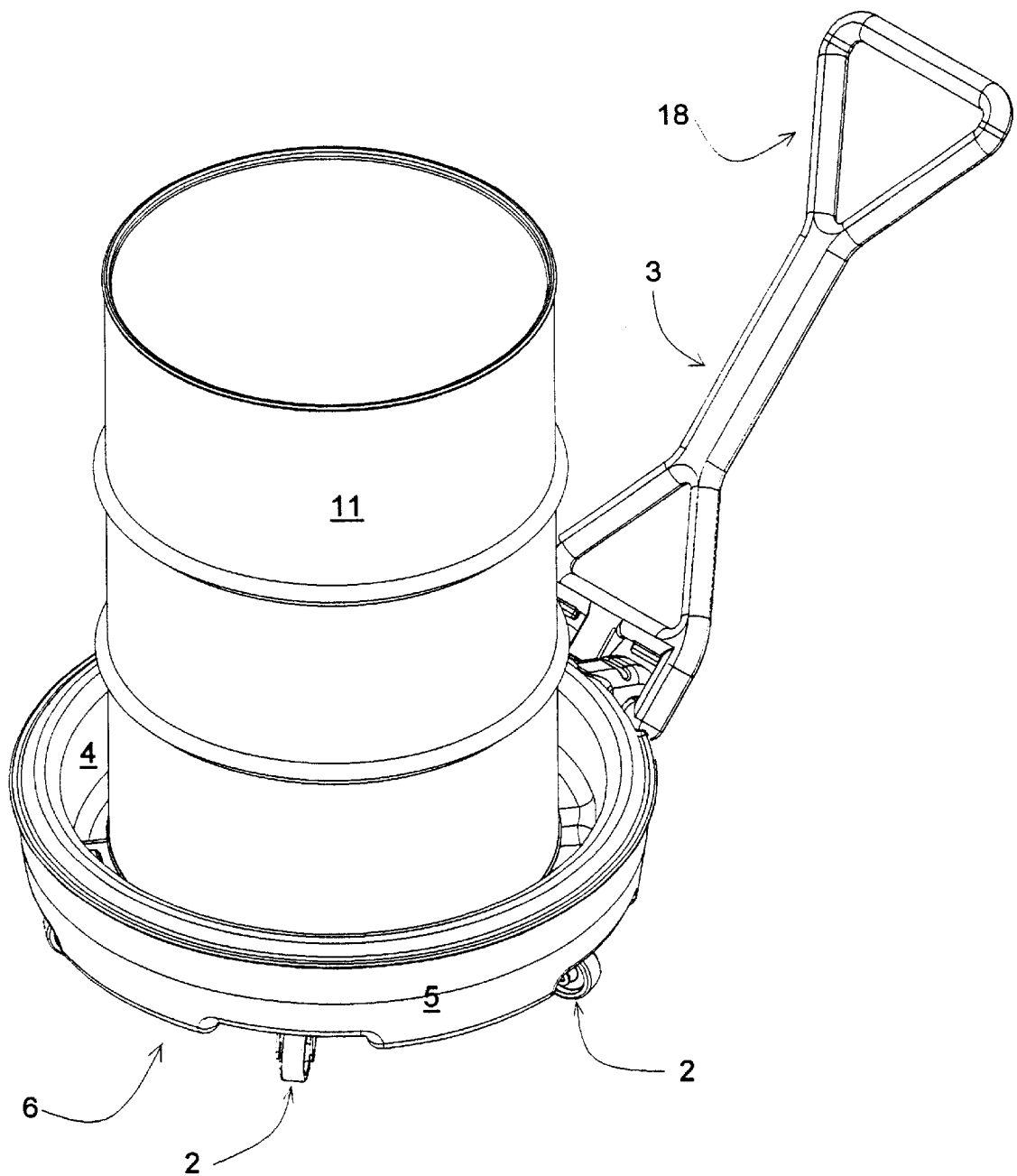
FIG. 3 is a perspective drawing of the dolly of the invention with a containment drum loaded onto the dolly.

FIG. 3 is a perspective view of the dolly with a storage drum 11 in place on the dolly.

Dimensions of the dolly are preferably selected to accommodate a 30 gallon or a 55 gallon drum, which are the sizes most widely used for industrial and commercial liquid materials as well as a 95 gallon over-pack drum. The dolly accommodates only one drum at a time, but is configured to accept any one of those sizes. Drum centering pads 12 are preferably slanted away from the center of the base so as to facilitate centering of a 30 gallon drum on the dolly. Drum centering pads 13 provide a ridge along their inward facing edges so as to facilitate centering of a 55 gallon drum on the dolly. Over-pack drums are centered by contact of their outer cylindrical surface with inner wall portion 4.

The pairs of drum centering pads 12, 13, are disposed directly above the casters 2 in order to more directly transfer the weight of the drum to the casters, which is discussed below. The dolly base is made to have sufficient rigidity to prevent buckling or the like by upwardly inclined walls in the top central portion 8, which are arranged to form a central hub 14 having a series of reinforcing spokes 15 and by the use of mold design and molding techniques, discussed below.

A containment cavity formed by inner wall portion 4, drum support portion 7, and top central portion 8 can contain stored material which might leak from the stored drum or be spilled by a worker obtaining material from the drum. In a preferred embodiment of the invention, the walls of the dolly making up the containment cavity are continuous and solid so as to prevent contained material from entering cavities 16 and 17 (FIG. 2) between the inner and outer wall portions 4 and 5, or other cavities formed by hub 14 and spokes 15. Casters of the dolly, which are disposed on bottom portion 6, are attached in a manner so as not to puncture any surface of the containment cavity. In the preferred embodiment, casters 2 having mounting plates (see FIG. 10), with apertures for fasteners such as lag screws, are provided. With use of lag screws, raised portions of the drum support portion 7, located beneath pads 12 and 13, provide a hollow (for example 17 in FIG. 2) into which lead ends of the lag screws can project without puncturing or protruding through any of the walls of the containment cavity. Screw cavities (6D of FIG. 2) are provided in bottom portion 6 for inserting at least leading threads of the lag screws to facilitate attachment of the casters. The screw cavities are formed by providing pins at the proper locations in the molds. When molding the dolly, the material of the dolly forms around the pins to create the screw cavities. Other types of casters, such as those having a vertical stem for mounting, can also be used with modification of the base, however, the stem should not protrude through the walls forming the containment cavity.

The capacity of the containment cavity can easily be altered by selecting inner and outer wall portions to have a height adequate for providing the containment capacity desired.

Figure 10:
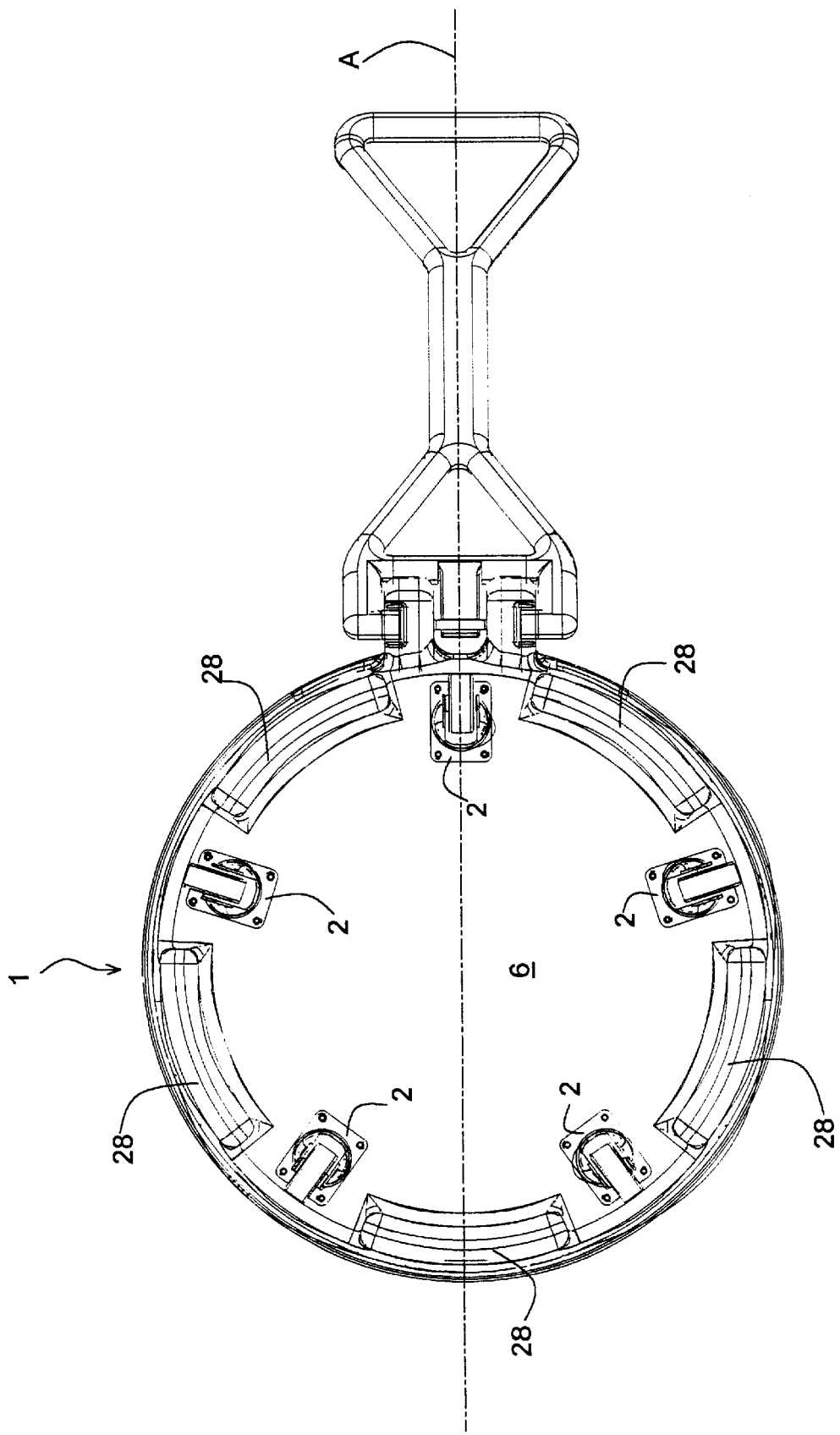
FIG. 10 is plan view of the bottom portion of the dolly with the handle attached.

In the preferred embodiment, five casters are provided on the dolly as shown in FIG. 10. That number of casters provides good stability, less wear on each caster because of reduced weight per caster, and ease of moving the dolly compared with providing a lesser number of casters. The casters are circumferentially equally spaced and are positioned beneath the pairs of drum centering pads 12 and 13. One of the casters is preferably in line, (see line A extending radially from the center of the base in FIG. 10), with handle connector 10, so as to provide the best stability when the dolly is being moved. The casters are preferably of the swivel type, although use of a fixed direction type can be used, for example, at the two locations most remote from the handle connector, to provide better directional control of the dolly when it is being moved.

Rigidity and strength needed to support the heavy loads discussed above are enhanced by proper mold design and molding techniques that promote "fusing" between certain walls of the dolly. As best depicted in FIG. 2, bottom portion 6 is fused to various other portions of the dolly to achieve the necessary strength. At location 6A, the bottom is fused with concave sections of drum support portion 7. At location 6B, a concave section of central hub 14 is fused to the bottom. At location 6c, concave sections between spokes 15 are fused to the bottom.

The area of fusing at 6A is continuous in a circumferential direction between the bases of generally vertical walls (7A of FIG. 5) which extend upward from concave sections of the drum support portion 7 to form the large spoke-like portions of the dolly where pads 12 and 13 are positioned. That arrangement of fused walls at the base of the generally vertical walls 7A, along with the placement of the casters in close proximity and centered between those walls, give the dolly the necessary strength to support the weight indicated above. With that configuration, strength is achieved without the use of walls having an excessive thickness. Mold design and molding technique must be such that the upper and bottom walls at 6A, 6B and 6C are in condition to contact each other so as to form the "fused" sections necessary for strength and rigidity of the dolly. The fused sections have a thickness approximately twice that of the general wall thickness.

Figure 9:
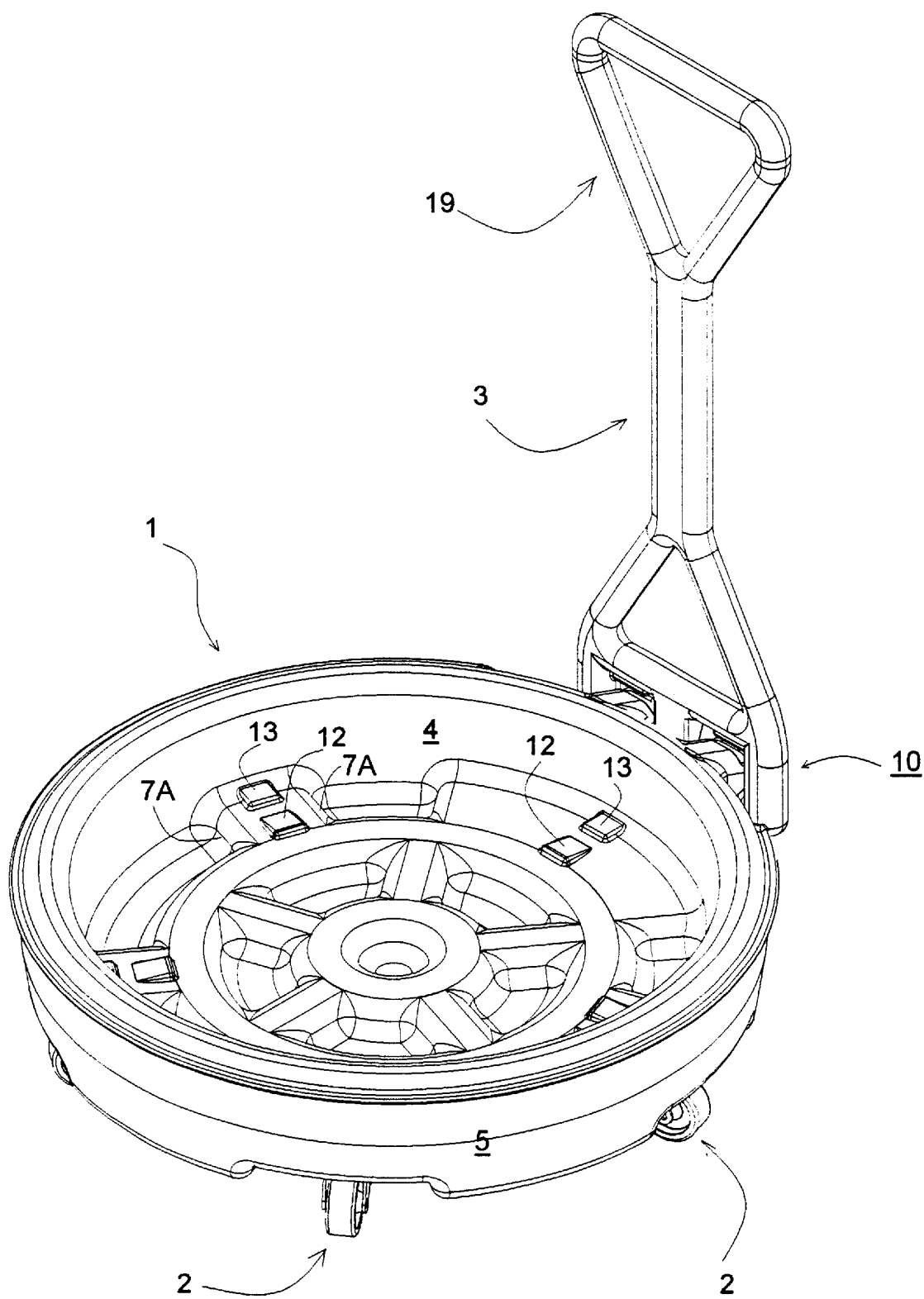
FIG. 9 is a perspective drawing of the dolly of the invention with the handle oriented vertically upward in a restrained position.

As best viewed in FIG. 9, the arrangement of the generally vertical walls 7a near both sides of pads 12 and 13 is found for four out of the five pad areas. However, that arrangement is not found near pads 12 and 13 opposite handle connector 10. The arrangement found near handle connector 10 is provided to better enable molding material for forming handle connector 10 during molding to have access to that area and thus assure the proper amount of material and the proper wall thickness for the handle connector.

Figure 4:
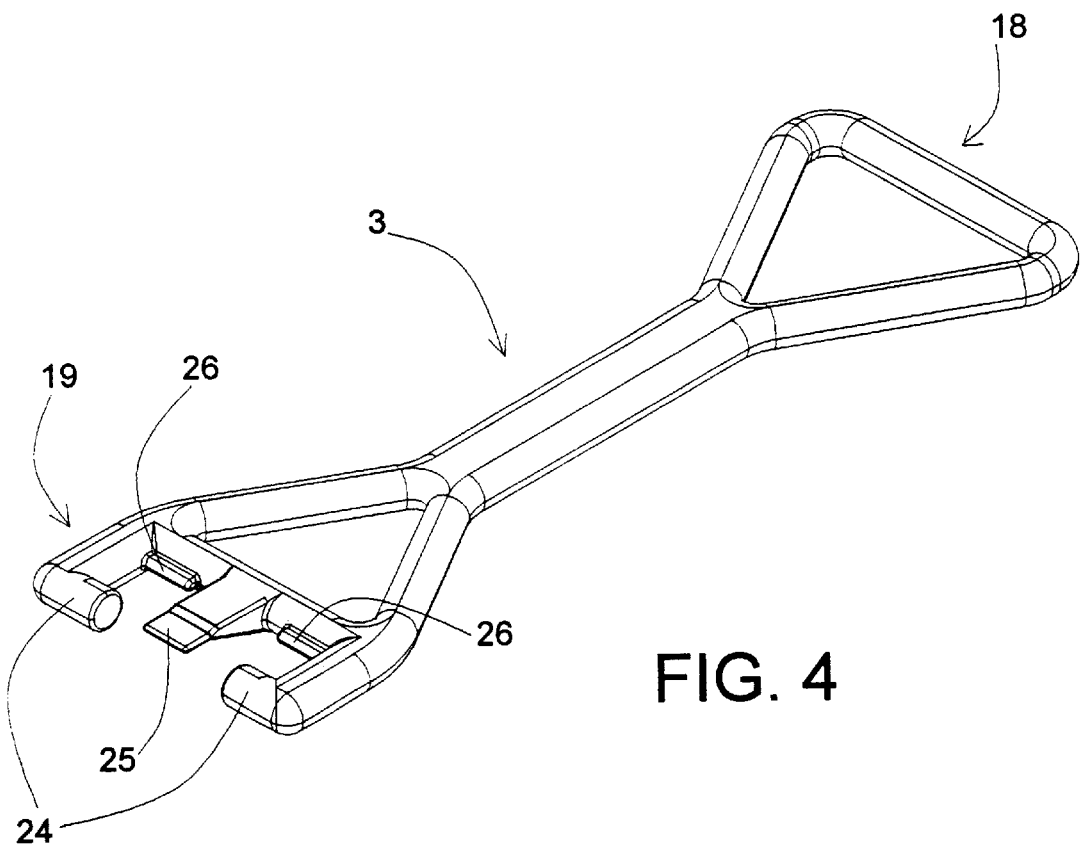
FIG. 4 is a perspective drawing of the handle of the dolly of the invention showing details of a connecting end of the handle.

Movement of the dolly is easily accomplished with use of elongated handle 3. Referring to FIG. 4, the handle 3 has a grasping end 18 and a connecting end 19 which connects with the handle connector 10 of the dolly base 1. The handle is conveniently removable, and when connected, it can be pivoted about a horizontal axis to position the grasping end 18 at a height suitable for a worker moving the dolly and drum. When the dolly and drum have been moved to the desired location, the handle can be easily restrained in an upward vertical orientation so as not to present a tripping hazard and to be in a space-saving and ready-to-use condition.

Connection and operation of the handle is described with reference to FIGS. 4, 5, 6, 7 and 8. Handle connector 10 extends outwardly from the outer wall portion 5 of the dolly base 1. Referring to FIG. 5, the handle connector includes a pair of flanges 20 having vertically directed receiving slots 21, locking bar 22 disposed between walls of the slots, and restraining grooves 23 in the flanges and facing upward. Referring to FIG. 4, the connecting end 19 of handle 3 includes spaced opposed pivot pins 24, locking tongue 25 extending toward the opening between the spaced pivot pins, and restraining bosses 26. The components of the handle connector 10 and the connecting end 19 of handle 3 are arranged such that, when the dolly base 1 is oriented with casters 2 contacting a horizontal dolly supporting surface (such as a manufacturing plant floor), 1) the handle is pivotable about a horizontal axis when in place on the handle connector, 2) the handle is slidably connectable to or disconnectable from the handle connector only when the handle is oriented vertically downward (FIG. 6), 3) the handle is locked to the handle connector when the handle is in place on the handle connector and oriented other than vertically downward, and 4) the handle is restrained in a vertically upward position when in place on the handle connector and pivoted to that position.

To connect the handle to the dolly base, the handle is positioned in a vertically downward orientation. It is to be understood, that in the following description, reference directions are relative to a drum dolly having its casters supported on a horizontal supporting surface. However, in actually connecting the handle to the dolly base, it may not be convenient to place the handle in a vertically downward orientation. Therefore, any position of the dolly base and handle resulting in the same described relative orientation, allows the handle to be connected or disconnected.

Figure 6:
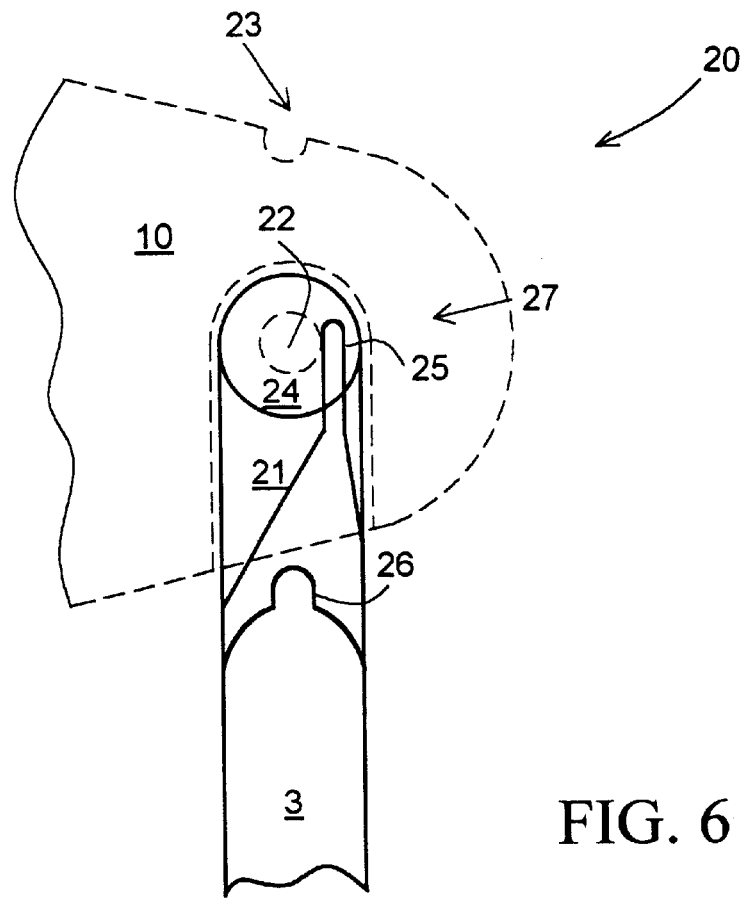
FIG. 6 is an enlarged side view of the connection between the handle and the dolly base with the handle oriented vertically downward for the connecting step.
Figure 7:
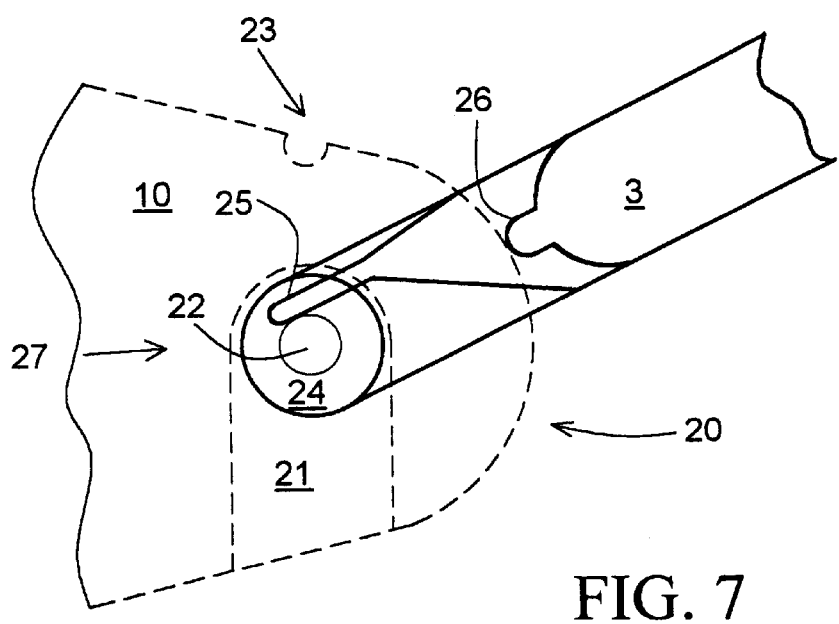
FIG. 7 is an enlarged side view of the connection between the handle and the dolly base with the handle oriented at an angle suitable for moving the dolly.
Figure 8:
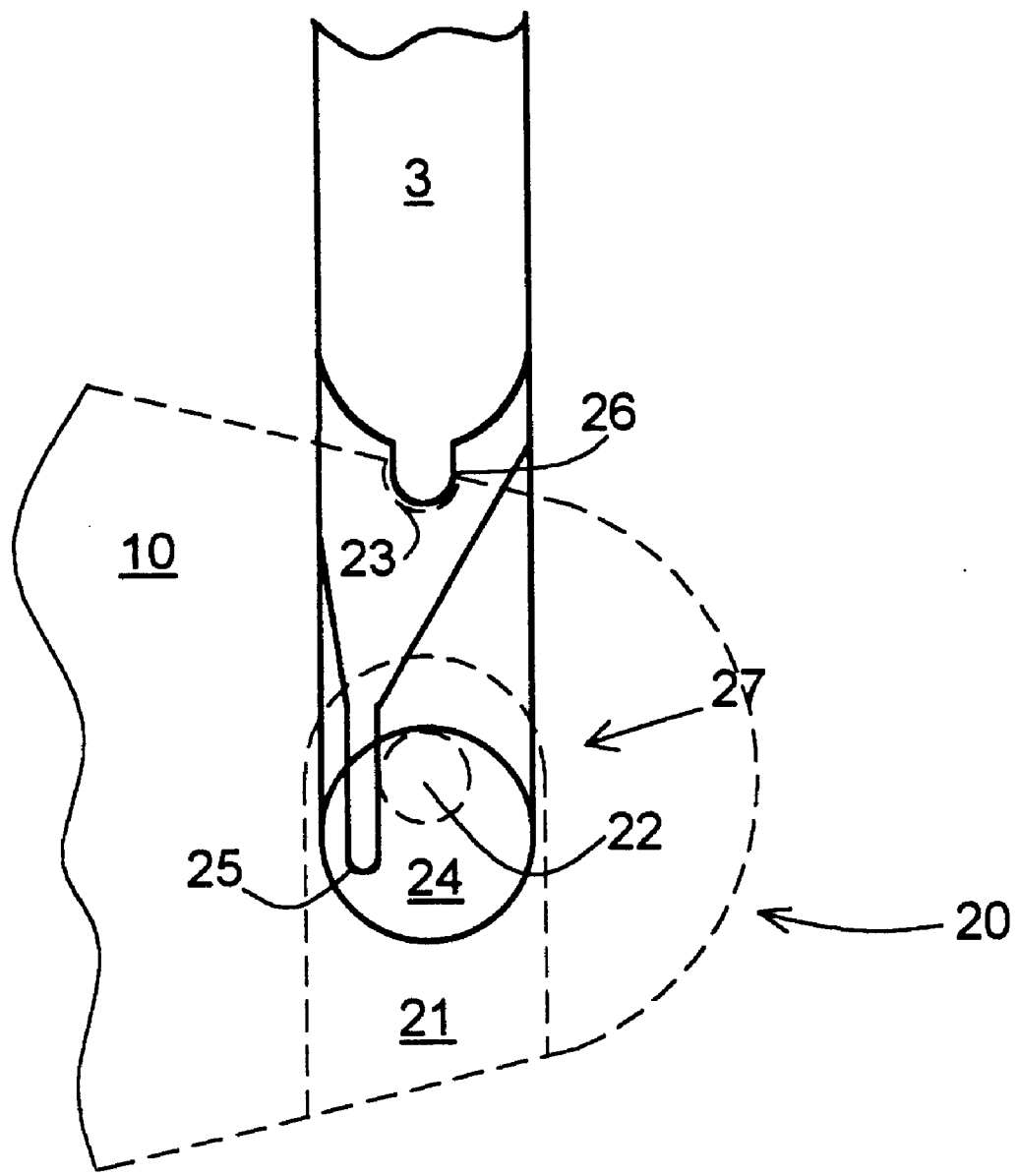
FIG. 8 is an enlarged side view of the connection between the handle and the dolly base with the handle oriented vertically upward for restraining the handle in a stored position.

Referring to FIG. 6, with the handle 3 in a vertically downward orientation, spaced opposed pivot pins 24 of handle 3 are slid into receiving slots 21 of the flanges 20 of the dolly base. The pivot pins 24 are slid to an upper rounded slot end 27 of slot 21, referred to as the pivoting location. Pivot pins 24 pivot during use of the handle at that location in the slots. FIG. 6 shows the relative positions of the connecting components at this connecting stage. In FIGS. 6, 7 and 8, solid lines depict components of handle 3 and dashed lines depict components of handle connector 10.

The handle connecting step is completed by pivoting the handle to between 90° and 180° from the initial connecting orientation. Upon pivoting, the handle locking tongue 25 of the handle 3, contacts locking bar 22 of the dolly base, to lock the handle at the pivoting location 27 by preventing downward movement of pivot pins 24 out of receiving slots 21. This locked condition is shown in FIG. 7 for when the handle is at a typical orientation for moving the dolly.

FIG. 8 shows the relative positions of the connecting components when the handle 3 is oriented vertically upward. When the handle is pivoted to that vertical orientation, restraining bosses 26 of handle 3 drop by gravity into restraining grooves 23 of the handle connector 10, and pivot pins 24 accordingly drop slightly below the pivoting location 27. With the handle positioned as described, it is restrained in a vertically upward orientation by the restraining bosses 26 resting in restraining grooves 23. When movement of the dolly is required, the handle is simply lifted vertically and pivoted slightly away from the vertical orientation to release the restraining bosses 26 from the restraining grooves 23. FIG. 9 shows a perspective view of the dolly with handle 3 restrained in the upward vertical orientation.

FIG. 10 shows bottom portion 6 of the dolly having casters 2 disposed uniformly circumferentially around the dolly. In order to provide a means for handling the dolly when a drum is not loaded on the dolly, and especially for upsetting it when it is necessary to empty material from the containment cavity, edge grasps 28 are provided near a peripheral edge of the dolly. Preferably an edge grasp is disposed in all of the spaces between all of the casters 2. Each grasp extends downwardly from the substantially planer bottom surface 6. FIGS. 1 and 2 show a perspective and sectional view of the grasps, respectively.

Specific materials, configuration, and methods of production have been set forth for purposes of describing the invention and specific embodiments of the invention. It should be recognized that the above teachings will enable those skilled in the art not only to understand and use the invention, but may also enable modifications or other process steps, values, and the like, which have not been specifically detailed in the above description. Therefore, it should be understood that reference shall be made to the appended claims for purposes of determining the scope of the present invention.

What is claimed is:

1. A dolly for a drum in which material is stored, said drum having a top end and an opposed bottom end separated and engaged by a cylindrically shaped side wall, said dolly comprising a base, for supporting the bottom end of the drum, said base having:
a drum support portion, upon which the bottom end of the drum bears,
a bottom portion disposed beneath said drum support portion,
inner and outer wall portions extending upwardly from said drum support portion and said bottom portion respectively,
a containment cavity, formed at least in part by said drum support portion and said inner wall portion for capturing and containing stored material if spilled or leaked from said drum, and
a handle connector extending from said outer wall portion;

a plurality of casters, disposed on said bottom portion of said base, for providing contact with a dolly supporting surface; and a detachable elongated handle having a connecting end, for pivotally engaging said handle connector, and an opposite grasping end for use in moving said dolly about on the dolly supporting surface;

wherein, when said base is oriented with said casters contacting a horizontal dolly supporting surface, said elongated handle is:
pivotable about a horizontal axis when connected to said handle connector,
slidably connectable to or disconnectable from said handle connector only when said elongated handle is oriented substantially vertically downward,
locked to said handle connector when said elongated handle is connected to said handle connector and pivoted to be oriented other than vertically downward, and wherein
said elongated handle is restrained from pivoting when said elongated handle is connected to said handle connector and oriented substantially vertically upward.

2. A dolly for a drum in which material is stored, according to claim 1, wherein said bottom portion includes at least one edge grasp extending downwardly from the peripheral edge of the dolly.

3. A dolly for a drum in which material is stored, said drum having a top end and an opposed bottom end separated and engaged by a cylindrically shaped side wall, said dolly comprising a base, for supporting the bottom end of the drum, said base having;
a drum support portion, upon which the bottom end of the drum bears, a bottom portion disposed beneath said drum support portion, inner and outer wall portions extending upwardly from said drum support portion and said bottom portion respectively, a containment cavity, formed at least in part by said drum support portion and said inner wall portion for capturing and containing stored material if spilled or leaked from said drum, a handle connector extending from said outer wall portion;

a plurality of casters, disposed on said bottom portion of said base, for providing contact with a dolly supporting surface; and a detachable elongated handle having a connecting end, for pivotally engaging said handle connector, and an opposite grasping end for use in moving said dolly about on the dolly supporting surface;

wherein, when said base is oriented with said casters contacting a horizontal dolly supporting surface, said elongated handle is:

pivotable about a horizontal axis when connected to said handle connector, slidably connectable to or disconnectable from said handle connector only when said elongated handle is oriented substantially vertically downward, locked to said handle connector when said elongated handle is connected to said handle connector and pivoted to be oriented other than vertically downward, and wherein said drum support portion bears substantially all the weight of the drum and includes a plurality of drum centering pads, said pads are disposed directly above said casters, said drum support portion has walls extending upwardly from concave sections toward at least one pair of said drum centering pads, and walls of said concave portions are fused to a wall forming said bottom portion.

4. A dolly according to claim 3, wherein said drum centering pads include a plurality of pads for centering a 30 gallon drum, and a plurality of pads for centering a 55 gallon drum.

5. A dolly according to claim 3, wherein said number of casters is five.

6. A dolly according to claim 3, wherein said upwardly extending walls are absent near the pair of drum centering pads closest to the handle connector of the dolly base.

7. A dolly for a drum in which material is stored, said drum having a top end and an opposed bottom end separated and engaged by a cylindrically shaped side wall, said dolly comprising a base, for supporting the bottom end of the drum, said base having:

a drum support portion, upon which the bottom end of the drum bears, a bottom portion disposed beneath said drum support portion, inner and outer wall portions extending upwardly from said drum support portion and said bottom portion respectively, a containment cavity, formed at least in part by said drum support portion and said inner wall portion for capturing and containing stored material if spilled or leaked from said drum, and a handle connector extending from said outer wall portion;

a plurality of casters, disposed on said bottom portion of said base, for providing contact with a dolly supporting surface; and a detachable elongated handle having a connecting end, for pivotally engaging said handle connector, and an opposite grasping end for use in moving said dolly about on the dolly supporting surface; and a top central portion having a plurality of upwardly sloping walls to form both a central hub and a plurality of spokes radiating from said central hub, so as to give rigidity to said base;

wherein, when said base is oriented with said casters contacting a horizontal dolly supporting surface, said elongated handle is:

pivotable about a horizontal axis when connected to said handle connector, slidably connectable to or disconnectable from said handle connector only when said elongated handle is oriented substantially vertically downward, and locked to said handle connector when said elongated handle is connected to said handle connector and pivoted to be oriented other than vertically downward.

8. A dolly according to claim 7, wherein said containment cavity is formed by said top central portion, said drum support portion, and said inner wall portion.

9. A dolly according to claim 7, wherein walls of cavities of said central hub and said pluralities of spokes in the top central portion of said base are fused to a wall forming said bottom portion.

10. A dolly for a drum in which material is stored, said drum having a top end and an opposed bottom end separated and engaged by a cylindrically shaped side wall, said dolly comprising a base, for supporting the bottom end of the drum, said base having:

a drum support portion, upon which the bottom end of the drum bears, a bottom portion disposed beneath said drum support portion, inner and outer wall portions extending upwardly from said drum support portion and said bottom portion respectively, a containment cavity, formed at least in part by said drum support portion and said inner wall portion for capturing and containing stored material if spilled or leaked from said drum, and a handle connector extending from said outer wall portion;

a plurality of casters, disposed on said bottom portion of said base, for providing contact with a dolly supporting surface; and a detachable elongated handle having a connecting end, for pivotally engaging said handle connector, and an opposite grasping end for use in moving said dolly about on the dolly supporting surface;

wherein, when said base is oriented with said casters contacting a horizontal dolly supporting surface, said elongated handle is:

pivotable about a horizontal axis when connected to said handle connector, slidably connectable to or disconnectable from said handle connector only when said elongated handle is oriented substantially vertically downward, and locked to said handle connector when said elongated handle is connected to said handle connector and pivoted to be oriented other than vertically downward; and wherein said elongated handle has, at the connecting end, spaced opposed pivot pins, a locking tongue extending toward the space therebetween, and a pair of restraining bosses; and said handle connector has flanges with receiving slots for receiving said opposed pivot pins and providing a pivoting location at an upper end thereof, a locking bar disposed between walls of said receiving slots for contacting said locking tongue, and a pair of upwardly facing restraining grooves for receiving said restraining bosses, said components of the handle connector and handle being configured such that:

contact between the locking tongue and locking bar prevents insertion of the pivot pins to the pivoting location unless the handle is oriented vertically downward;

contact between the locking tongue and locking bar locks the handle on the handle connector when the pivot pins are positioned at the pivoting location and the handle is oriented other than vertically downward; and the restraining bosses enter the restraining grooves, by gravity, when the pivot pins are positioned at the pivoting location and the handle is oriented vertically upward, so as to restrain the handle in that vertically upward orientation.

* * * * *